UNITED STATES PATENT OFFICE.

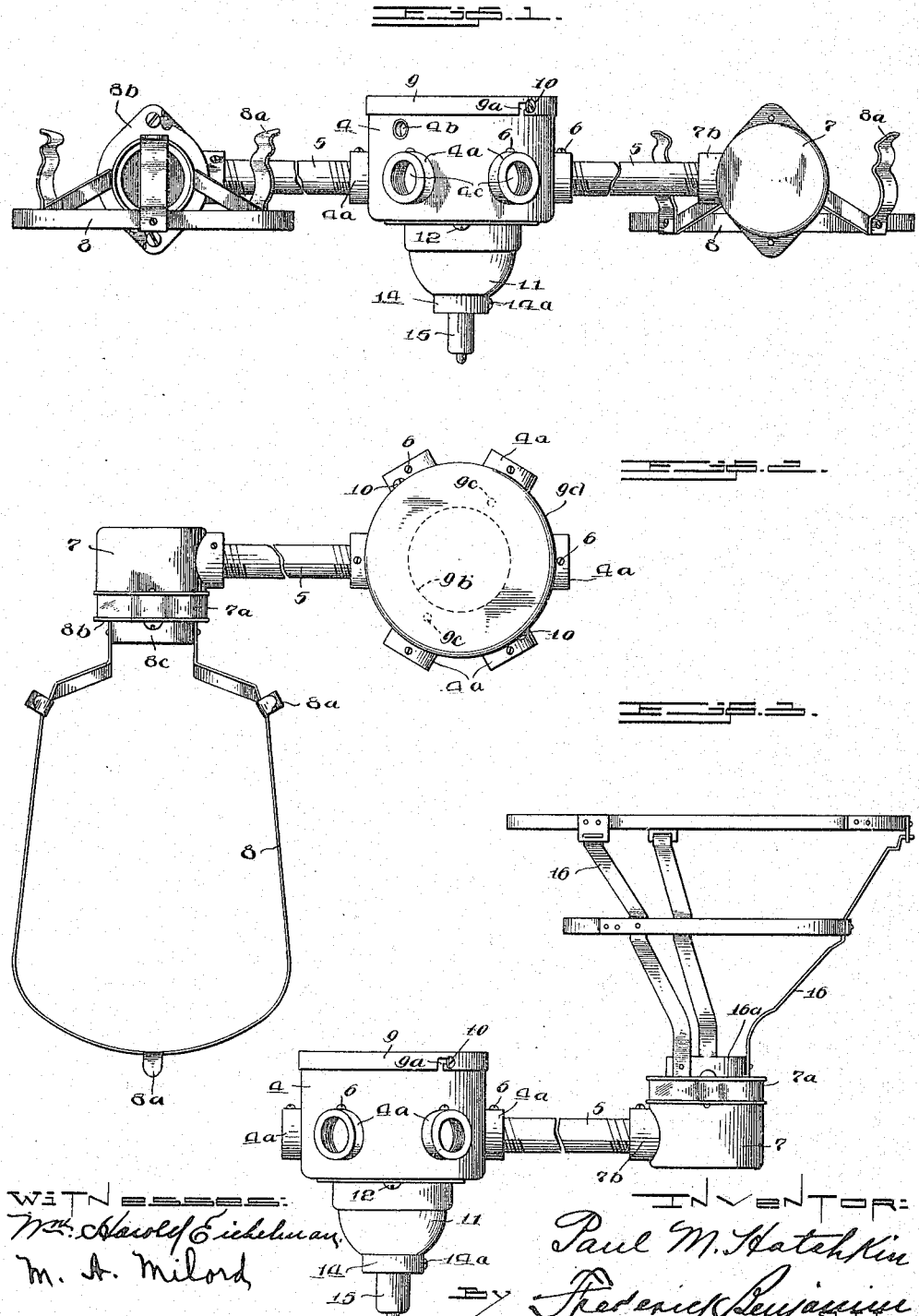

PAUL M. HOTCHKIN, OF CHICAGO, ILLINOIS.

ELECTRIC-LIGHT FITTING.

1,129,982. Specification of Letters Patent. Patented Mar. 2, 1915.

Application filed May 22, 1912. Serial No. 698,981.

*To all whom it may concern:*

Be it known that I, PAUL M. HOTCHKIN, citizen of the United States, residing at Chicago, in the county of Cook and State of Illinois, have invented certain new and useful Improvements in Electric-Light Fittings, of which the following is a specification.

My present invention relates to improvements in electric light fittings and has special reference to the provision of fittings for installing electric lights in fixtures and especially in such fixtures as are used for indirect lighting.

The object of my invention is the provision of a fitting which may be used in connection with a number of different sizes of fixtures and a number of different styles of installations, and in which the wires will be covered or inclosed.

I attain the above object by means of the structure illustrated in the accompanying drawing, in which:—

Figure 1 is an elevation of one arrangement of my invention for installing electric wiring, lights and reflectors in an indirect lighting fixture designed to support the parts shown; Fig. 2 is a plan showing the central fitting with one lateral terminal, and reflector bracket connected therewith, and Fig. 3 is an elevation of the central fitting and terminal connected therewith with a different form of reflector bracket.

It is desirable, both from the considerations of rigidity and safety, to have the wiring up to and including the lamp socket incased in metal conduit.

It will be understood that the circuit comes to the central fixture in a metallic conduit not shown.

I provide the central fixture conduit box 4 which is preferably cylindrical in form. The sides of the box 4, at one end, are rounded in to form a lower flange to which may be attached by screws 12, a switch operating casing or box 11 which has provided upon one end thereof a collar 14 through which access is had to the box, and a set screw 14ª is provided in said collar so that the portion of the switch 15, which extends outside of the switch box, may be secured therein, said switch operating means being of conventional form. At various points arranged radially about the central fixture conduit box 4, are openings 4ᶜ which have integral collars 4ª provided about them, which collars are interiorly threaded, further provided with set screws 6, so that when branching pieces of conduit 5 are screwed therein, they can be secured firmly in place by means of the set screws 6. The other end of the central fixture conduit box opposite the switch casing 11, is closed with a cover 9, the side flanges of which extend down on the outside of the box, and have provided therein bayonet slots 9ª which engage with screws 10 inserted near the upper edge of the central fixture conduit box 4. Upon the ends of the branch conduit pipes leading from the central fixture conduit box, are arranged terminal socket boxes 7, (described in another application filed at the same time herewith). These terminal socket boxes 7, are provided with laterally extending collars 7ᵇ similar to the collars 4ª of the central fixture conduit boxes to receive the conduit pipes 5. In the terminal socket boxes 7, fits a porcelain or other insulating socket 7ª to the front of which is secured a cover plate 8ᵇ having a collar 8ᶜ extending therefrom and to this collar is secured a frame 8, which carries the spring arms 8ª for engaging a reflector not shown.

In Fig. 1, I have shown two opposite arms provided with terminals and reflector brackets for holding horizontally disposed reflectors in connection with horizontally held lamps, and in Fig. 2 is a plan of one terminal with this same arrangement. In Fig. 3, however, I have shown a terminal provided with a vertically disposed lamp and a suitable reflector for such a disposition of lamp. The current supplying wires enter the central box 4 through a hole 4ᵇ in the side thereof.

It will be noted that the switch operating device 11 may be readily detached from the bottom of the central fixture by removing the screws 12, and in its place may be attached either a cover plate 9ᵈ consisting of a mere disk having holes 9ᶜ to permit the passage of the screws 12, or the cover 9 may be duplicated at this point, other screws 10 being provided therefor. The cover plate 9, or 9ᵈ, may have a central opening formed therein as indicated by dotted lines 9ᵇ in Fig. 2, and when thus formed, other conduits or sockets may be inserted or attached to the central fixture, thus adapting my improved fitting to a wide range of uses in electric illumination, where it is important that no wires be exposed and where the fitting may be supported from above or below by tubes, chains, or by the bowls which are now extensively employed in systems of indirect lighting.

Having thus described my invention, what I claim as new and desire to secure by Letters Patent, is:—

A fixture for electric lighting systems comprising a cylindrical box open at its ends and the side walls whereof have radially disposed apertures, threaded collars extending outwardly from said apertures, pipes removably fitting said collars, terminal socket boxes secured to the opposite ends of said pipes and provided with means for the attachment of suitable fitting supporting brackets, detachable closures for the top and bottom of said first mentioned box one of which forms a switch casing and the other of which forms means for the attachment of supporting fittings, and a switch operating device extended through the former closure.

In testimony whereof I affix my signature in the presence of two witnesses.

PAUL M. HOTCHKIN.

Witnesses:
ESTELLA WOLFF,
G. R. LE BROCK.

Copies of this patent may be obtained for five cents each, by addressing the "Commissioner of Patents, Washington, D. C."